(12) United States Patent
Murakami

(10) Patent No.: US 9,641,709 B2
(45) Date of Patent: May 2, 2017

(54) ELECTRONIC APPARATUS WITH A DISPLAY SECTION ON WHICH SCREENS ARE DISPLAYED AND NON-TRANSITORY COMPUTER READABLE STORAGE MEDIUM THAT STORES A DISPLAY CONTROL PROGRAM

(71) Applicant: KYOCERA Document Solutions Inc., Osaka-shi, Osaka (JP)

(72) Inventor: Takashi Murakami, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 44 days.

(21) Appl. No.: 14/656,735

(22) Filed: Mar. 13, 2015

(65) Prior Publication Data

US 2015/0264201 A1 Sep. 17, 2015

(30) Foreign Application Priority Data

Mar. 17, 2014 (JP) ................................ 2014-053457

(51) Int. Cl.
*G06F 3/12* (2006.01)
*H04N 1/00* (2006.01)

(52) U.S. Cl.
CPC ............................... *H04N 1/00503* (2013.01)

(58) Field of Classification Search
CPC combination set(s) only.
See application file for complete search history.

(56) References Cited

U.S. PATENT DOCUMENTS

| 8,503,010 B2 | 8/2013 | Satake | |
|---|---|---|---|
| 2005/0210408 A1* | 9/2005 | Baranda | G06F 9/4443 715/810 |
| 2006/0055975 A1* | 3/2006 | Toda | H04N 1/00347 358/1.16 |
| 2006/0294464 A1* | 12/2006 | Tokimoto | G03G 15/502 715/705 |
| 2007/0133015 A1* | 6/2007 | Saeki | G03G 15/5016 358/1.2 |
| 2008/0018666 A1* | 1/2008 | Takeuchi | H04N 5/23245 345/629 |
| 2010/0110480 A1* | 5/2010 | Satake | G06F 9/4443 358/1.15 |
| 2011/0096348 A1* | 4/2011 | Ebi | G03G 15/50 358/1.14 |

FOREIGN PATENT DOCUMENTS

| JP | 2007249370 A | 9/2007 |
|---|---|---|
| JP | 2010108304 A | 5/2010 |

* cited by examiner

*Primary Examiner* — Henok A Shiferaw

(57) ABSTRACT

An electronic apparatus includes a display device, a storage device, and a display control circuit. The storage device stores data for screens to be displayed on the display device. The display control circuit controls the display of the screens by the display device based on the data stored in the storage device. The display control circuit enables switching between a first mode in which data for a plurality of types of screens can be stored in the storage device and a second mode in which data for a single type of screen can be stored in the storage device. The first mode displays a screen on the display device based on only data permitted to be displayed on the display device among the data for the plurality of types of screens in the storage device.

12 Claims, 6 Drawing Sheets

FIG.4

|  | TYPE | STATUS |
|---|---|---|
| FIRST HIERARCHY LEVEL | SYSTEM ERROR SCREEN | NON-DISPLAY |
| SECOND HIERARCHY LEVEL | AUTHENTICATION SCREEN | NON-DISPLAY |
| THIRD HIERARCHY LEVEL | COPY SCREEN | DISPLAY |
| | PRINT SCREEN | NON-DISPLAY |
| | FAX SCREEN | NON-DISPLAY |

ELECTRONIC APPARATUS WITH A DISPLAY SECTION ON WHICH SCREENS ARE DISPLAYED AND NON-TRANSITORY COMPUTER READABLE STORAGE MEDIUM THAT STORES A DISPLAY CONTROL PROGRAM

INCORPORATION BY REFERENCE

The disclosure of Japanese Patent Application No. 2014-53457 filed on Mar. 17, 2014 including the specification, drawings and abstract is incorporated herein by reference in its entirety.

BACKGROUND

This disclosure relates to an electronic apparatus with a display section on which screens are displayed and a non-transitory computer readable storage medium that stores a display control program.

A typical electronic apparatus that displays screens on its display section is capable of storing data for a plurality of types of screens in a storage section and displaying a screen on the display section based on only data permitted to be displayed among the data for the screens in the storage section. The typical electronic apparatus stores data for a plurality of types of screens that may be possibly displayed on the display section into the storage section in advance and selects data for a screen to be actually displayed on the display section from the data for the plurality of types of the screens stored in the storage section. Therefore, when screens are switched, there is no need to create data for a screen to be displayed after switching screens. Thus, the typical electronic apparatus can switch screens at high speed.

SUMMARY

In one aspect of the present disclosure, an electronic apparatus includes a display device, a storage device, and a display control circuit. The storage device stores data for screens to be displayed on the display device. The display control circuit controls the display of the screens by the display device based on the data stored in the storage device. The display control circuit enables switching between a first mode in which data for a plurality of types of screens can be stored in the storage device and a second mode in which data for a single type of screen can be stored in the storage device. The first mode displays a screen on the display device based on only data permitted to be displayed on the display device among the data for the plurality of types of screens in the storage device.

BRIEF DESCRIPTION OF THE DRAWINGS

FIG. 4 illustrates an example of information organized by a display control unit of FIG. 2 in the performance priority mode.

DETAILED DESCRIPTION

With reference to the accompanying drawings, an embodiment of the present disclosure will be described below.

First, the configuration of a multifunction peripheral (MFP), which is an electronic apparatus according to the embodiment, will be described.

Figure 1:
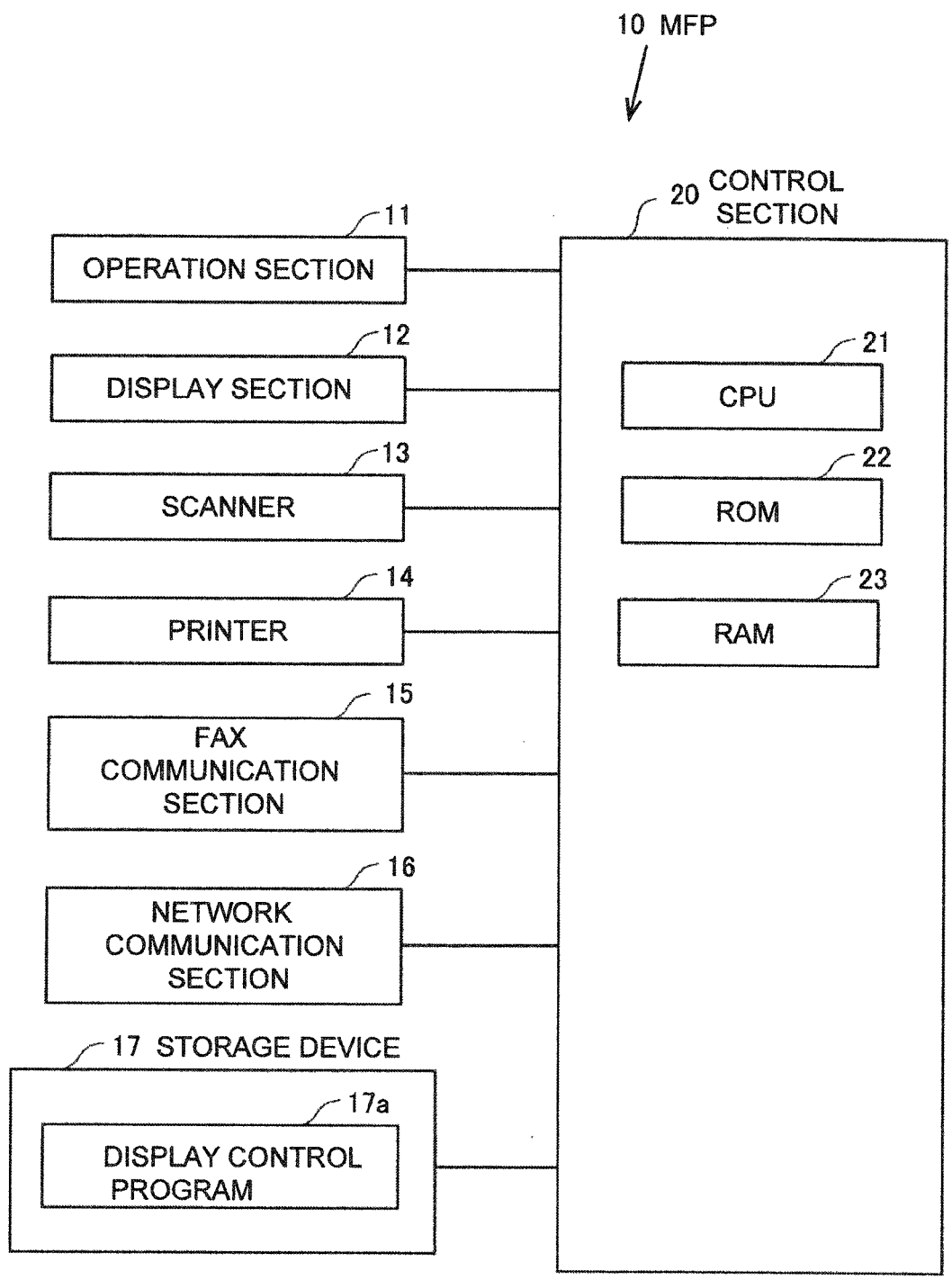
FIG. 1 shows the configuration of an MFP according to an embodiment of the present disclosure.

FIG. 1 shows the configuration of an MFP 10 according to the embodiment.

As shown in FIG. 1, the MFP 10 includes an operation section 11, a display section 12, a scanner 13, a printer 14, a fax communication section 15, a network communication section 16, a storage device 17, and a control section 20. The operation section 11 is an input device, such as a button, through which various operations are input by users. The display section 12 is a display device, such as a liquid crystal display (LCD), used to display various items of information. The scanner 13 is a reading device that reads image data from an original document. The printer 14 is a printing device that performs print operation on recording media such as paper. The fax communication section 15 is a facsimile device that performs fax communication with external facsimile devices via a communication line, such as a public telephone line. The network communication section 16 is a network communication device that communicates with external devices via a network, such as a local area network (LAN) and the Internet. The storage device 17 may be an electrically erasable programmable read only memory (EEPROM) or a hard disk drive (HDD) and stores various types of data. The control section 20 controls the entire MFP 10.

The operation section 11 may be combined with the display section 12 to be provided in the form of a touch panel.

The storage device 17 stores a display control program 17a executed to display screens on the display section 12. The display control program 17a may be installed into the MFP 10 at a manufacturing stage of the MFP 10, may be additionally installed into the MFP 10 from a recording medium, such as an SD card and a universal serial bus (USB) memory, or may be additionally installed into the MFP 10 through a network.

The control section 20 is a circuit that includes, for example, a central processing unit (CPU) 21, a read only memory (ROM) 22, which stores programs and various items of data, and a random access memory (RAM) 23, which is used as a work area for the CPU 21. The CPU 21 runs programs stored in the ROM 22 or the storage device 17.

The RAM 23 includes a storage section that stores data for screens (hereinafter referred to as "screen data") to be displayed on the display section 12.

Figure 2:
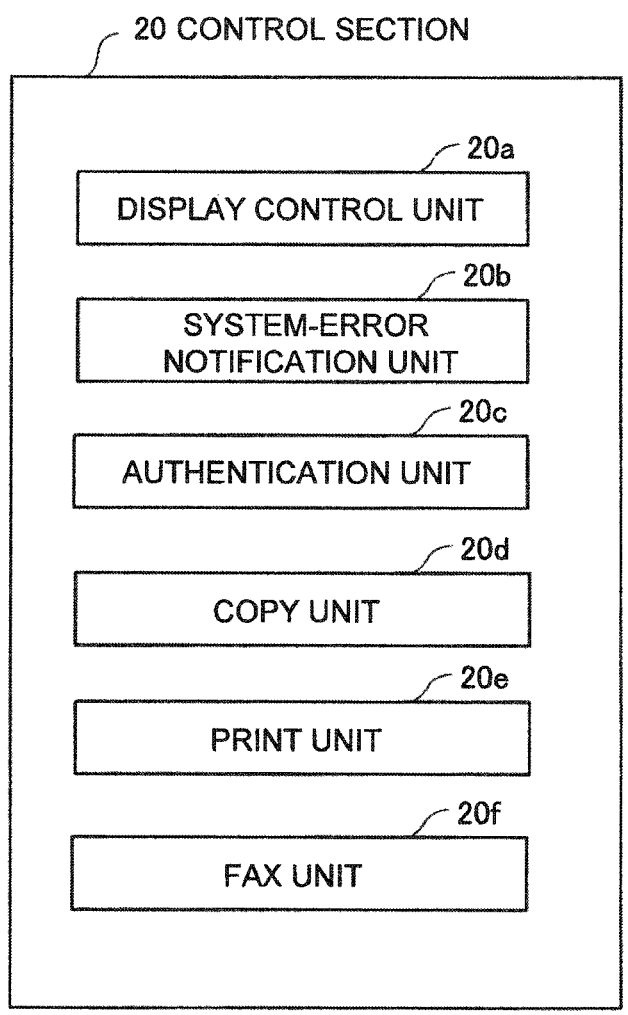
FIG. 2 illustrates the configuration of a control section shown in FIG. 1.

FIG. 2 shows the configuration of the control section 20.

As shown in FIG. 2, the control section 20 includes a circuit that operates by executing the display control program 17a (see FIG. 1) stored in the storage device 17 (see FIG. 1), as a display control unit 20a that controls the display of screens by the display section 12 (see FIG. 1) based on the screen data stored in the RAM 23 (see FIG. 1).

Additionally, the control section 20 includes a circuit that operates by executing a program stored in the ROM 22 (see FIG. 1) or storage device 17, as a system-error notification unit 20b that notifies users of system errors of the MFP 10 (see FIG. 1).

The system errors may be, for example, an error caused by lack of free space in the RAM 23, and an error in the event of firmware anomaly.

Additionally, the control section 20 includes a circuit that operates by executing a program stored in the ROM 22 or storage device 17, as an authentication unit 20c that performs authentication of users of the MFP 10.

Furthermore, the control section 20 includes a circuit that operates by executing a program stored in the ROM 22 or storage device 17, as a copy unit 20d that performs a copying feature by using the printer 14 (see FIG. 1) forming an image on a recording medium based on image data read from an original document by the scanner 13 (see FIG. 1), a print unit 20e that performs a printing feature by using the printer 14 forming an image on a recording medium based on print data received by the network communication section 16 (see FIG. 1), and a fax unit 20f that performs facsimile transmission and reception using the fax communication section 15 (see FIG. 1).

The display control unit 20a enables switching between a performance priority mode, which is a first mode allowing storage of screen data for a plurality of types of screens in the RAM 23, and a memory priority mode, which is a second mode allowing storage of screen data for a single type of screen in the RAM 23. The performance priority mode displays a screen on the display section 12 based on only screen data permitted to be displayed on the display section 12 among the screen data for the plurality of types of screens stored in the RAM 23.

In this embodiment, five types of screens will be described as examples of screens displayed on the display section 12: a system error screen relating to system errors notified by the system-error notification unit 20b; an authentication screen relating to authentication checks performed by the authentication unit 20c; a copy screen relating to a copying operation performed by the copy unit 20d; a print screen relating to a printing operation performed by the print unit 20e; and a fax screen relating to a facsimile operation performed by the fax unit 20f. The MFP 10 can display other types of screens on the display section 12.

By the way, copy-relating errors are not displayed on the system error screen, but are displayed on the copy screen. Similarly, print-relating errors and facsimile-relating errors are displayed on the print screen and fax screen, respectively.

Description will be now given about the performance priority mode.

Figure 3:
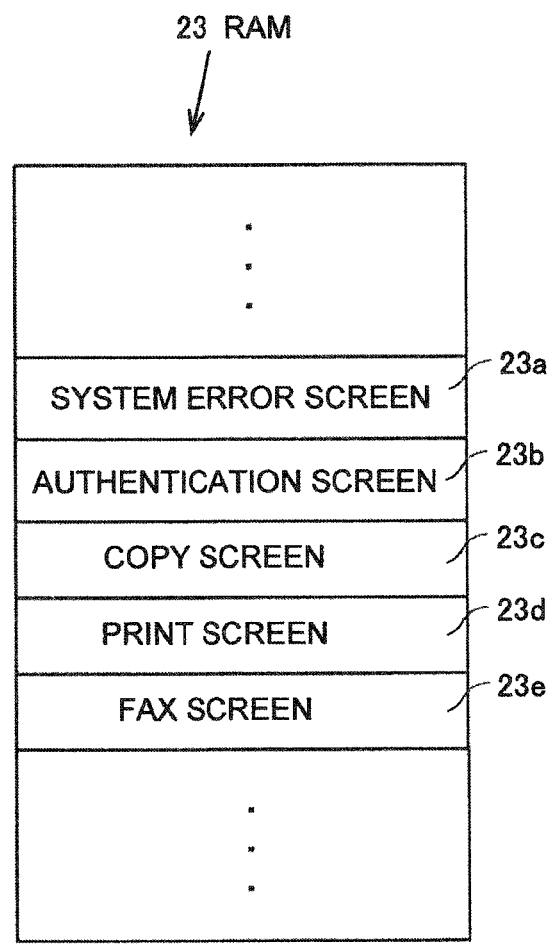
FIG. 3 illustrates an example RAM of FIG. 1 in a performance priority mode.

FIG. 3 illustrates an example of the RAM 23 in the performance priority mode.

As shown in FIG. 3, the display control unit 20a (see FIG. 2) in the performance priority mode can store screen data 23a for the system error screen, screen data 23b for the authentication screen, screen data 23c for the copy screen, screen data 23d for the print screen, and screen data 23e for the fax screen in the RAM 23.

Upon detecting an occurrence of a system error, the system-error notification unit 20b (see FIG. 2) instructs the display control unit 20a to create screen data 23a. Then, the display control unit 20a creates screen data 23a in response to the instruction from the system-error notification unit 20b and stores the created screen data 23a in the RAM 23.

If a user instructs to perform user authentication on the MFP 10 (see FIG. 1) through, for example, the operation section 11 (see FIG. 1), the authentication unit 20c (see FIG. 2) instructs the display control unit 20a to create screen data 23b. Then, the display control unit 20a creates screen data 23b in response to the instruction from the authentication unit 20c and stores the created screen data 23b in the RAM 23.

At the time when the performance priority mode is enabled, the display control unit 20a creates screen data 23c, screen data 23d, and screen data 23e and stores the created screen data 23c, screen data 23d, and screen data 23e in the RAM 23.

FIG. 4 illustrates an example of information organized by the display control unit 20a (see FIG. 2) in the performance priority mode.

As shown in FIG. 4, the display control unit 20a in the performance priority mode organizes hierarchy, types, and status of screens.

The screen hierarchy includes a first hierarchy level to which the system error screen belongs, a second hierarchy level to which the authentication screen belongs, and a third hierarchy level to which the copy screen, print screen, and fax screen belong.

Status of screen includes "DISPLAY" and "NON-DISPLAY". Screen data of a screen in "DISPLAY" status is permitted to be displayed on the display section 12 (see FIG. 1). Screen data of a screen in "NON-DISPLAY" status is not permitted to be displayed on the display section 12. Specifically, the display control unit 20a does not display screens in "NON-DISPLAY" status on the display section 12, even if the RAM 23 (see FIG. 1) stores the screen data of screens in "NON-DISPLAY" status. In a case where a plurality of types of screens belong to the same hierarchy level, the display control unit 20a assigns "DISPLAY" to only one type of screen at a maximum among the plurality types of screens belonging to the same hierarchy level. The storage device 17 (see FIG. 1) owns a table that defines what type of screen is assigned with "DISPLAY" or "NON-DISPLAY" when the MFP 10 (see FIG. 1) is in what operational state. The display control unit 20a sets the status of each screen based on the operational state of the MFP 10 and the table stored in the storage device 17.

The screen that belongs to the first hierarchy level and is in the "DISPLAY" status is laid over the screen that belongs to the second hierarchy level and is in the "DISPLAY" status and the screen that belongs to the third hierarchy level and is in the "DISPLAY" status when those screens are displayed on the display section 12. The screen that belongs to the second hierarchy level and is in the "DISPLAY" status is laid over the screen that belongs to the third hierarchy level and is in the "DISPLAY" status when those screens are displayed on the display section 12.

In the example shown in FIG. 4, the display control unit 20a displays only a copy screen based on the screen data 23c on the display section 12, even though screen data 23a of a system error screen (see FIG. 3), screen data 23b of an authentication screen (see FIG. 3), screen data 23c of a copy screen (see FIG. 3), screen data 23d of a print screen (see FIG. 3), and screen data 23e of a fax screen (see FIG. 3) are stored in the RAM 23.

Next, description will be made about a memory priority mode.

Figure 5:
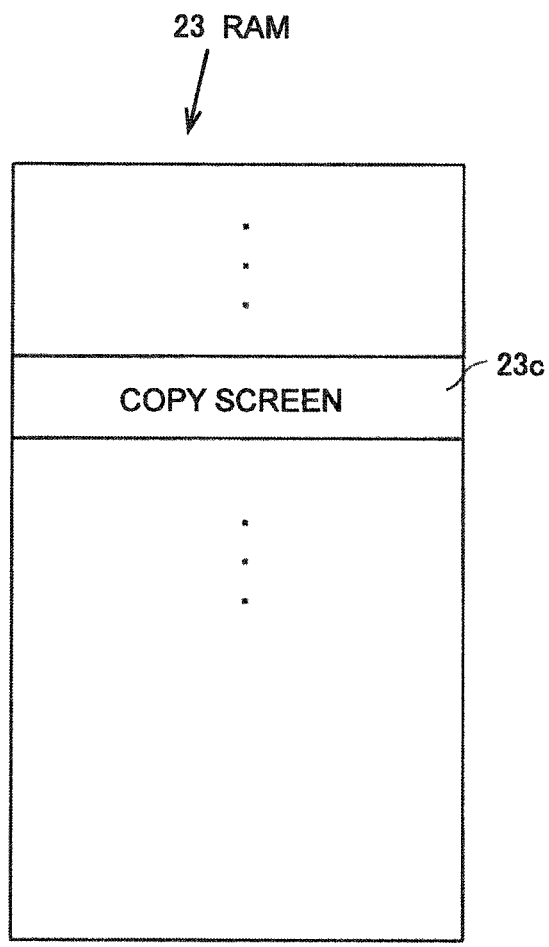
FIG. 5 illustrates an example RAM of FIG. 1 in a memory priority mode.

FIG. 5 illustrates an example of the RAM 23 in the memory priority mode.

As shown in FIG. 5, the display control unit 20a in the memory priority mode can store screen data for only one type of screen in the RAM 23 among screen data 23a for the system error screen (see FIG. 3), screen data 23b for the authentication screen (see FIG. 3), screen data 23c for the copy screen, screen data 23*d* for the print screen (see FIG. 3), and screen data 23*e* for the fax screen (see FIG. 3). In the example shown in FIG. 5, the display control unit 20*a* stores only the screen data 23*c* in the RAM 23 and displays only the copy screen based on the screen data 23*c* on the display section 12.

Next, description will be made about operation of the MFP 10 to display screens.

Figure 6:
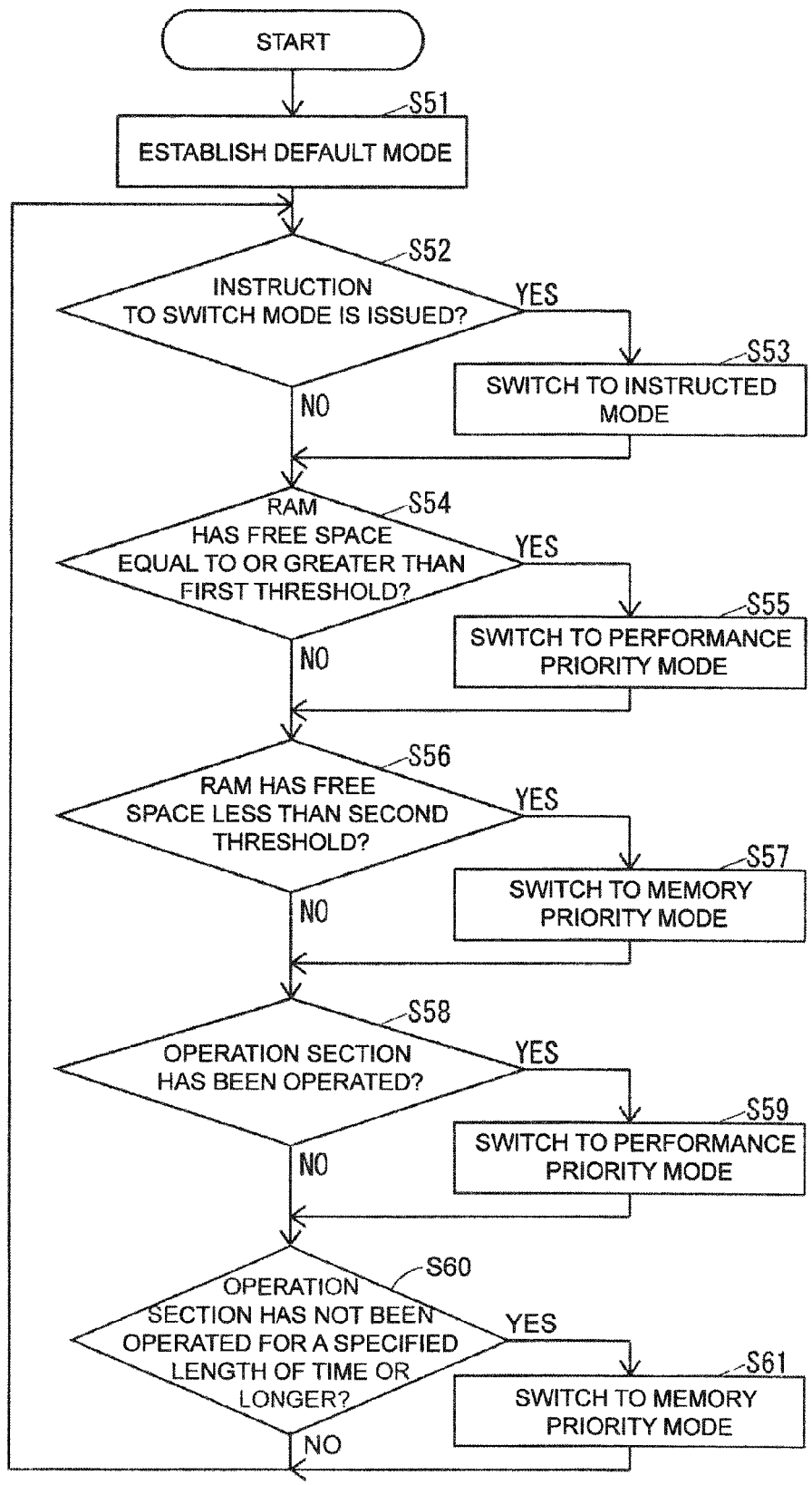
FIG. 6 illustrates operational steps to display screens by an MFP in FIG. 1.

FIG. 6 illustrates operational steps performed by the MFP 10 to display screens.

As shown in FIG. 6, the display control unit 20*a* of the control section 20 establishes either one of the performance priority mode and memory priority mode, but the one set as a default mode (S51).

Then, the display control unit 20*a* determines whether or not an instruction to switch the mode has been issued, for example, through the operation section 11 (S52).

If the display control unit 20*a* determines that the instruction to switch the mode has been issued in S52, the display control unit 20*a* switches the current mode to the instructed mode (S53). If the display control unit 20*a* is already in the performance priority mode and an instruction to switch to the performance mode is issued, the display control unit 20*a* does not switch the mode. Similarly, if the display control unit 20*a* is already in the memory priority mode and an instruction to switch to the memory priority mode is issued, the display control unit 20*a* does not switch the mode.

When switching from the memory priority mode to the performance priority mode, the display control unit 20*a* continuously maintains screen data that has been stored in the RAM 23 since before switching modes. In addition, when switching from the memory priority mode to the performance priority mode, the display control unit 20*a* creates screen data 23*c*, screen data 23*d*, and screen data 23*e* and stores the created screen data 23*c*, screen data 23*d*, and screen data 23*e* in the RAM 23 at the time when the memory priority mode is switched to the performance priority mode. However, if the screen data that has been stored in the RAM 23 since before switching modes is any of the screen data 23*c*, screen data 23*d* and screen data 23*e*, the display control unit 20*a* does not create new screen data the same as the screen data that has been stored in the RAM 23 since before switching the modes.

In addition, when switching from the memory priority mode to the performance priority mode, the display control unit 20*a* sets the status of the screen based on the screen data stored in the RAM 23 before switching modes to "DISPLAY" as well as setting the status of screens other than the screen based on the screen data stored in the RAM 23 before switching modes to "NON-DISPLAY".

Therefore, even after the memory priority mode is switched to the performance priority mode, the display control unit 20*a* can continuously display the screen that has been displayed on the display section 12 since before switching the modes.

When switching from the performance priority mode to the memory priority mode, the display control unit 20*a* continuously stores screen data of a screen at the highest hierarchy level among screens in "DISPLAY" status in the RAM 23, but deletes the other screen data from the RAM 23, except for the screen data of the screen at the highest hierarchy level among the screens in "DISPLAY" status.

Therefore, even after the performance priority mode is switched to the memory priority mode, the display control unit 20*a* can continuously display the screen that has been displayed on the display section 12 since before switching the modes.

If the display control unit 20*a* determines that it is not instructed to switch the mode in S52 or completes the process in S53, the display control unit 20*a* then determines whether or not the RAM 23 has free space equal to or greater than a first threshold (S54).

If the display control unit 20*a* determines that the free space is equal to or greater than the first threshold in S54, the display control unit 20*a* switches the mode to the performance priority mode (S55). If the display control unit 20*a* is already in the performance priority mode, the display control unit 20*a* does not switch the mode to the performance priority mode.

If the display control unit 20*a* determines that the free space is not equal to or greater than the first threshold in S54 or completes the process in S55, the display control unit 20*a* then determines whether or not the free space of the RAM 23 is less than a second threshold (S56). In this embodiment, the second threshold is set to be lower than the first threshold.

If the display control unit 20*a* determines that the free space is less than the second threshold in S56, the display control unit 20*a* switches the mode to the memory priority mode (S57). If the display control unit 20*a* is already in the memory priority mode, the display control unit 2*a* does not switch the mode to the memory priority mode.

If the display control unit 20*a* determines that the free space is not less than the second threshold in S56 or completes the process in S57, the display control unit 20*a* then determines whether or not the operation section 11 has been operated (S58).

If the display control unit 20*a* determines that the operation section 11 has been operated in S58, the display control unit 20*a* switches the mode to the performance priority mode (S59). If the display control unit 20*a* is already in the performance priority mode, the display control unit 20*a* does not switch the mode to the performance priority mode.

If the display control unit 20*a* determines that the operation section 11 has not been operated in S58 or completes the process in S59, the display control unit 20*a* then determines whether or not the operation section 11 has not been operated for a specified length of time or longer (S60).

If it is determined that the specified length of time has elapsed in S60, the display control unit 20*a* switches the mode to the memory priority mode (S61). If the display control unit 20*a* is already in the memory priority mode, the display control unit 20*a* does not switch the mode to the memory priority mode.

If the display control unit 20*a* determines that the specified length of time has not elapsed in S60 or completes the process in S61, the display control unit 20*a* executes a process in S52.

As described above, when in the performance priority mode, the MFP 10 stores not only screen data for screens that are actually being displayed on the display section 12, but also screen data for a plurality of types of screens that may be possibly displayed on the display section 12 in the RAM 23 in advance, thereby taking up a large amount of storage space in the RAM 23 for screen display. However, the MFP 10 in the performance priority mode stores the screen data for the plurality of types of screens that may be possibly displayed on the display section 12 in the RAM 23 in advance and selects screen data for screens to be actually displayed on the display section 12 from the screen data for the plurality of types of screens stored in the RAM 23 based on the status of the screens as shown in FIG. 4. Therefore, when screens are switched, there is no need to create screen data for screens to be displayed after switching screens. Thus, the MFP 10 can rapidly change screens in the performance priority mode.

On the contrary, when in the memory priority mode, the MFP 10 stores screen data for only one type of screen in the RAM 23, and therefore switching screens requires the MFP 10 to perform a process of deleting screen data for screens stored before the switching occurs from the RAM 23 and a process of creating screen data for screens to be displayed after the switching occurs. Therefore, the MFP 10 is slow to switch screens. However, the MFP 10 in the memory priority mode stores screen data for only one type of screen in the RAM 23, thereby taking up a small amount of storage space in the RAM 23 for screen display.

Thus, the MFP 10 can optimize the space available for screen display in the RAM 23 and the screen switching speed by appropriately switching between the performance priority mode that requires a large amount of space for screen display in the RAM 23, but switches screens at high speed, and the memory priority mode that switches screens at low speed, but requires a small amount of space for screen display in the RAM 23 (S53, S55, S57, S59, S61).

Since the MFP 10 automatically switches between the performance priority mode that requires a large amount of space for screen display in the RAM 23, but switches screens at high speed, and the memory priority mode that switches screens at low speed, but requires a small amount of space for screen display in the RAM 23 based on the amount of free space in the RAM 23 (S54 to S57), the space available for screen display in the RAM 23 and the screen switching speed can be optimized based on the amount of free space in the RAM 23.

Since when the operation section 11 is operated (YES in S58), the MFP 10 in the performance priority mode that requires a large amount of space for screen display in the RAM 23, but switches screens at low speed automatically switches (S59) the mode to the memory priority mode that switches screens at high speed, but requires a small amount of space for screen display in the RAM 23, enhancement of the screen switching speed can be achieved when the operation section 11 is operated, or, in other words, when the possibility of frequently switching the screens is high.

Since when the operation section 11 has not been operated for a specified length of time or longer (YES in S60), the MFP 10 in the performance priority mode that requires a large amount of space for screen display in the RAM 23, but switches screens at high speed automatically switches the mode to the memory priority mode that switches screens at low speed, but requires a small amount of space for screen display in the RAM 23 (S61), reduction of the space available for screen display in the RAM 23 can be achieved when the operation section 11 has not been operated for a specified length of time or longer or, in other words, when the possibility of frequently switching the screens is low.

The MFP 10 can omit at least any one of the processes in S52 and S53, processes in S54 and S55, processes in S56 and S57, processes in S58 and S59, and processes in S60 and S61.

Although the MFP 10 can execute the processes in S54 to S57 based on two thresholds, the first threshold and second threshold, the MFP 10 can execute the processes in S54 to S57 based on one threshold. In other words, the first threshold and second threshold may have the same value.

The electronic apparatus of the present disclosure is an MFP in this embodiment; however, the electronic apparatus can be any image forming apparatus other than the MFP, such as a printer, a copier, a facsimile, or can be any electronic apparatuses other than image forming apparatuses, such as a personal computer (PC), as long as the electronic apparatus has a display section on which screens are displayed.

What is claimed is:

1. An electronic apparatus comprising:
    a display device;
    a storage device that stores data of screens to be displayed on the display device; and
    a display control circuit that controls the display of the screens on the display device based on the data stored in the storage device, wherein
    the display control circuit enables switching between
       a first mode in which data for screens that belong to respective hierarchy levels in a plurality of hierarchy levels can be stored in the storage device, and
       a second mode in which data for only one type of screen can be stored in the storage device, and
    the first mode displays, based only on data permitted to be displayed among the data for the screens stored in the storage device, a screen that belong to one hierarchy level among the data permitted to be displayed on the display device, and wherein,
    when the display control circuit switches from the first mode to the second mode, or from the second mode to the first mode, the display control circuit continuously display the screen that has been displayed on the display device since before switching the modes, and wherein,
    when the second mode is switched to the first mode, the display control circuit continuously maintains screen data that has been stored in the storage device since before switching modes, creates another screen data, and permits the screen that has been stored in the storage device since before switching the modes to be displayed.

2. The electronic apparatus according to claim 1, wherein, when the first mode is switched to the second mode, the display control circuit continuously stores screen data of a screen at the highest hierarchy level among screens that is permitted to be displayed, but deletes the other screen data from the storage device.

3. The electronic apparatus according to claim 1, wherein the display control circuit switches between the first mode and the second mode based on the amount of free space in the storage device.

4. The electronic apparatus according to claim 1 comprising
    an operation device, wherein
    if the operation device is operated when in the second mode, the display control circuit switches from the second mode to the first mode.

5. The electronic apparatus according to claim 4, wherein
    if the operation device has not been operated for a specified length of time or longer when in the first mode, the display control circuit switches from the first mode to the second mode.

6. The electronic apparatus according to claim 1 comprising
    an operation device, wherein
    if the operation device has not been operated for a specified length of time or longer when in the first mode, the display control circuit switches from the first mode to the second mode.

7. A non-transitory computer readable storage medium that stores a display control program executable by a computer of an electronic apparatus, wherein the display control program is executed by the electronic apparatus including
a display device, and
a storage device that stores data of screens to be displayed on the display device,
the display control program causes the electronic apparatus to function as a display control circuit that controls the display of the screens on the display device based on the data stored in the storage device,
the display control circuit enables switching between
a first mode in which data for screens that belong to respective hierarchy levels in a plurality of hierarchy levels can be stored in the storage device, and
a second mode in which data for only one type of screen can be stored in the storage device, and
the first mode displays, based only on data permitted to be displayed among the data for the screens stored in the storage device, a screen that belong to one hierarchy level among the data permitted to be displayed on the display device, and wherein,
when the display control circuit switches from the first mode to the second mode, or from the second mode to the first mode, the display control circuit continuously display the screen that has been displayed on the display device since before switching the modes, and wherein,
when the second mode is switched to the first mode, the display control circuit continuously maintains screen data that has been stored in the storage device since before switching modes, creates another screen data, and permits the screen that has been stored in the storage device since before switching the modes to be displayed.

8. An electronic apparatus comprising:
a display device;
a storage device that stores data of screens to be displayed on the display device; and
a display control circuit that controls the display of the screens on the display device based on the data stored in the storage device, wherein
the display control circuit enables switching between
a first mode in which data for screens that belong to respective hierarchy levels in a plurality of hierarchy levels can be stored in the storage device, and
a second mode in which data for only one type of screen can be stored in the storage device, and
the first mode displays a screen on the display device based on only data permitted to be displayed on the display device among the data for the plurality of types of screens stored in the storage device, and wherein
the display control circuit switches between the first mode and the second mode based on the amount of free space in the storage device, and
the display control circuit switches to the first mode if the free space is equal to or greater than the first threshold, and the display control circuit switches to the second mode if the free space is less than the second threshold that is set to be lower than the first threshold.

9. The electronic apparatus according to claim 8 comprising
an operation device, wherein
if the operation device is operated when in the second mode, the display control circuit switches from the second mode to the first mode.

10. The electronic apparatus according to claim 8, wherein
if the operation device has not been operated for a specified length of time or longer when in the first mode, the display control circuit switches from the first mode to the second mode.

11. The electronic apparatus according to claim 8 comprising
an operation device, wherein
if the operation device has not been operated for a specified length of time or longer when in the first mode, the display control circuit switches from the first mode to the second mode.

12. A non-transitory computer readable storage medium that stores a display control program executable by a computer of an electronic apparatus, wherein
the display control program is executed by the electronic apparatus including
a display device, and
a storage device that stores data of screens to be displayed on the display device,
the display control program causes the electronic apparatus to function as a display control circuit that controls the display of the screens on the display device based on the data stored in the storage device,
the display control circuit enables switching between
a first mode in which data for screens that belong to respective hierarchy levels in a plurality of hierarchy levels can be stored in the storage device, and
a second mode in which data for only one type of screen can be stored in the storage device, and
the first mode displays a screen on the display device based on only data permitted to be displayed on the display device among the data for the plurality of types of screens stored in the storage device, and wherein
the display control circuit switches between the first mode and the second mode based on the amount of free space in the storage device, and
the display control circuit switches to the first mode if the free space is equal to or greater than the first threshold, and the display control circuit switches to the second mode if the free space is less than the second threshold that is set to be lower than the first threshold.

* * * * *